Figure 1:
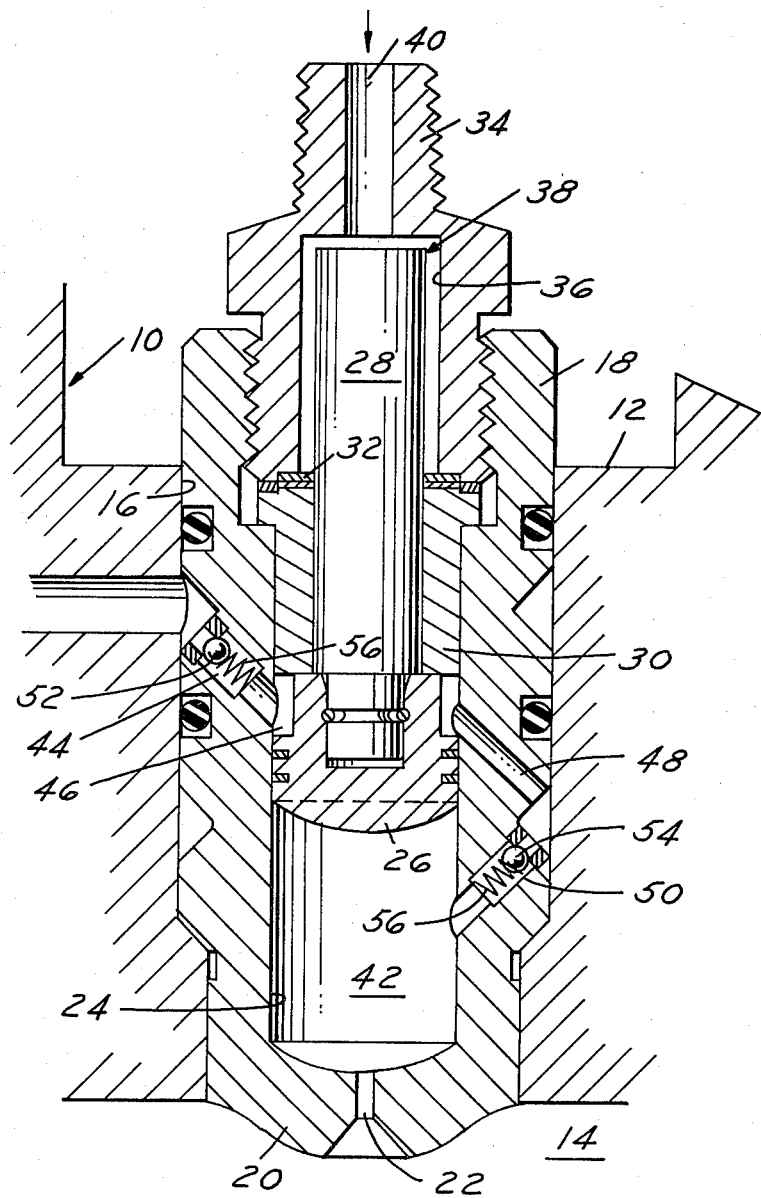

United States Patent [19]

Schechter

[11] 4,384,553
[45] May 24, 1983

[54] TWO STAGE COMPRESSION IGNITION FUEL IGNITOR

[75] Inventor: Michael M. Schechter, Southfield, Mich.

[73] Assignee: Ford Motor Company, Dearborn, Mich.

[21] Appl. No.: 219,105

[22] Filed: Dec. 22, 1980

[51] Int. Cl.³ .............................................. F02P 23/00
[52] U.S. Cl. ................................................ 123/143 A
[58] Field of Search ..................................... 123/143 A

[56] References Cited

U.S. PATENT DOCUMENTS

| | | | |
|---|---|---|---|
| 898,779 | 9/1908 | Plank | 123/143 A |
| 1,163,604 | 12/1915 | Raser | 123/143 A |
| 1,466,943 | 9/1923 | Ball | 123/143 A |
| 2,091,987 | 9/1937 | Honn | 123/143 A |
| 2,148,458 | 2/1939 | Grahman | 123/143 A |
| 3,058,453 | 10/1962 | May | 123/143 A |
| 3,060,912 | 10/1962 | May | 123/143 A |
| 3,279,448 | 10/1966 | Schniering | 123/143 A |
| 4,324,211 | 4/1982 | Strong | 123/143 A |

FOREIGN PATENT DOCUMENTS

| | | | |
|---|---|---|---|
| 2388135 | 4/1977 | Fed. Rep. of Germany | 123/143 A |
| 341949 | 4/1904 | France | 123/143 A |
| 501559 | 4/1920 | France | 123/143 A |

Primary Examiner—Ronald B. Cox
Attorney, Agent, or Firm—Robert E. McCollum; Clifford L. Sadler

[57] ABSTRACT

An automotive type fuel ignitor having an ignitor chamber continuously exposed to the engine combustion chamber temperatures and pressures for a first stage of compression of an air/fuel mixture thereon during the compression stage movement of the engine piston, a piston in the ignitor chamber being moved by a high pressure hydraulic force selectively applied thereto through a second stage of compression to raise the mixture charge pressure and temperature to the auto-ignition level, forcing the flame jet into the main combustion chamber, suitable inlet and outlet check valves controlling the supply of mixture charge to the ignitor chamber.

6 Claims, 3 Drawing Figures

TWO STAGE COMPRESSION IGNITION FUEL IGNITOR

This invention relates in general to a compression ignition type fuel ignitor. More particularly, it relates to one for use in an engine in which the compression ratio may be too low at times to produce compression pressures and temperatures that will provide consistent compression ignition under normal circumstances. The ignitor includes a small ignitor chamber connected to the engine combustion chamber by a small orifice and supplied with an air/fuel mixture charge. The charge is first compressed during the compression stage in the combustion chamber and then experiences a second compression by a high pressure hydraulic force applied to a piston moveable in the ignitor chamber. The second stage compression raises the pressure and temperature of the mixture charge to the auto ignition level, whereupon it exits from the chamber in a flame jet into the main combustion chamber to ignite the mixture charge therein.

Ignitors of the general type described above are known in the prior art. For example, U.S. Pat. No. 4,075,996, Hisserich, External Compression Ignition System For Internal Combustion Engines, shows a compression ignition type fuel ignitor that contains an ignition chamber 18 connected to a main combustion chamber by an orifice 19. It includes a ram type piston 9 that compresses an air/fuel mixture charge in the ignitor chamber to the auto ignition level for passage of a flame jet into the main combustion chamber. However, control of the operation of the ram piston in Hisserich requires a complicated and costly electronic system. It also requires the use of an electromagnetically operated fuel injector 12. Furthermore, the ignitor is not a two-stage compression type since the components 26 to the exhaust conduit 27 is open at all times other than when the ram piston 9 is moved to compress the mixture charge to the auto ignition pressure level.

It is a primary object of this invention, therefore, to provide a two-stage compression ignition fuel ignitor that is relatively simple in construction and operation and relatively inexpensive in cost.

It is another object of the invention to provide, in one embodiment, an ignitor of the type described that can be fitted into the conventional spark plug opening of an engine; including a housing defining an ignitor chamber connected to an engine main combustion chamber by an orifice to provide a first stage of compression of an air/fuel mixture in the ignitor chamber, a piston being slideable in the ignitor chamber to compress the air/fuel mixture charge to a second stage of compression by means of a high pressure hydraulic fluid force applied to the piston; suitable air/fuel flow inlet check valves being provided for admitting the air/fuel mixture charge to the ignitor chamber while preventing exposure of the check valves to the harsh environment of combustion during compression movement of the piston, other embodiments illustrating other methods of induction of the air/fuel mixture charge into the ignitor chamber.

Figure 2:
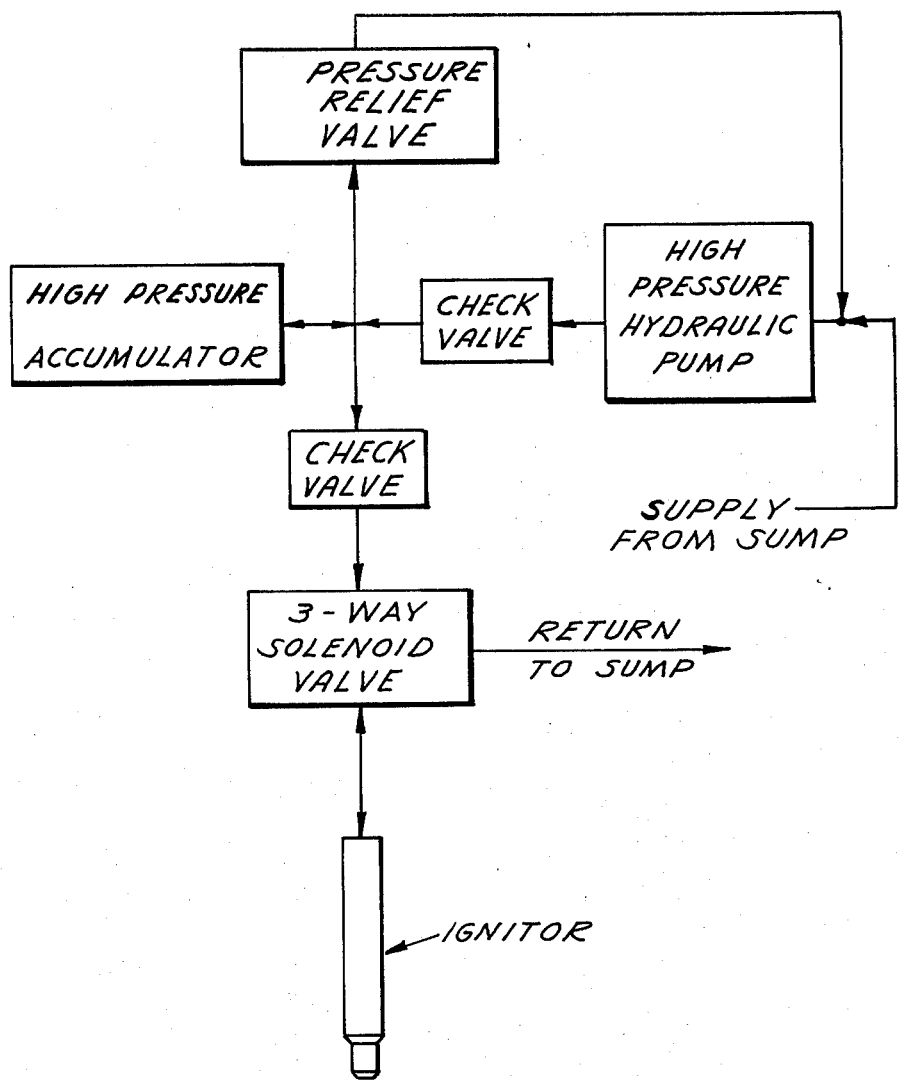
Figure 3:
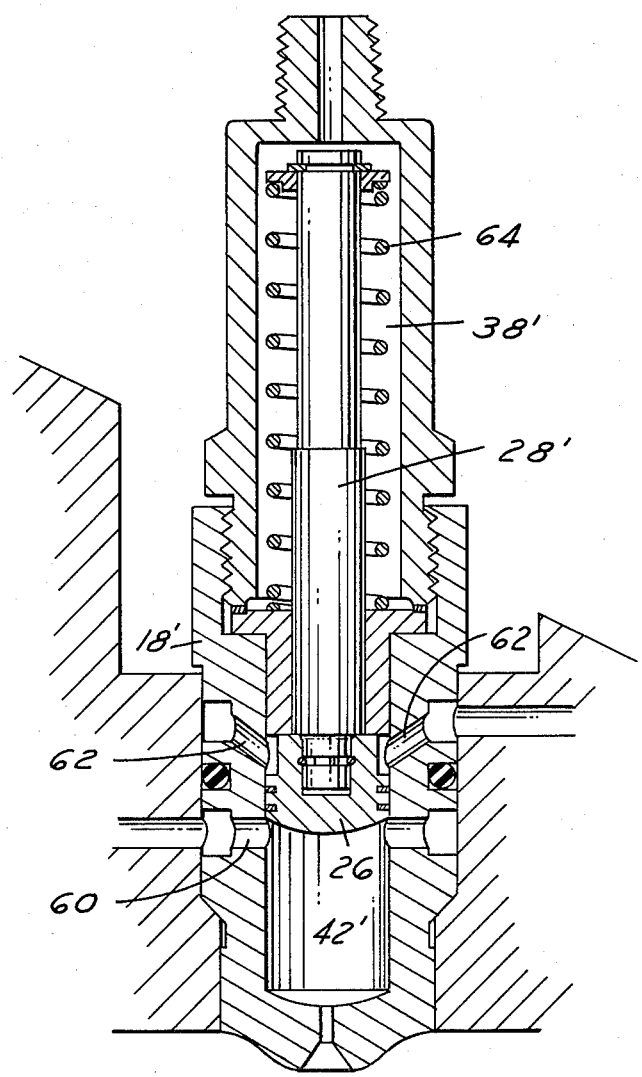

Other objects, features, and advantages of the invention will become more apparent upon reference to the succeeding detailed description thereof, and to the drawings illustrating the preferred embodiments thereof; wherein, FIG. 1 is a cross-sectional view of an ignitor constructed according to the invention and installed in an engine;

FIG. 2 schematically represents a hydraulic actuation system for the ignitor illustrated in FIG. 1; and, FIG. 3 illustrates a further embodiment of the invention.

FIG. 1 shows a portion 10 of an internal combustion engine having a cylinder head 12 overlying the conventional engine block that contains at least one cylinder bore defining a combustion chamber 14. Cylinder head 12 contains a bore 16 that can be similar to or the same as the conventional spark plug opening. Screwed into bore 16 would be a hollow housing 18 of the ignitor of this invention. Housing 18 essentially is closed at the combustion chamber end 20 except for a controlled opening or small orifice 22. The latter connects the combustion chamber pressures and temperatures at all times to a central stepped diameter bore 24 provided in ignitor housing 18. Slideably mounted within the bore is an ignitor piston 26. The piston is secured to a plunger 28 that projects axially and sealingly from the piston through a guide sleeve 30 and seal rings 32. A housing cover 34 is threaded into the upper end of ignitor housing 18 and is provided with a recess 36 for reception of the end of plunger 28. It also defines a hydraulic chamber 38 in the space between the plunger and housing adapted to be connected by a passage 40 to a source of high pressure hydraulic fluid. The latter could be any suitable source of high pressure fluid controlled selectively to be admittable or vented from passage 40 on demand in accordance with the operating conditions of the engine to provide an operation to be described at the desired time.

The space between ignitor piston 26 and the end of bore 24 adjacent orifice 22 defines an ignitor chamber 42. An air/fuel mixture is supplied to the chamber through a passage 44 in housing 18 that connects to an annular supply chamber 46 behind the piston. Chamber 46 is defined by a reduced land portion on the backside of piston 26 and the space between the outer diameter of plunger 28 and the lower edge portion of sleeve 30. This supply chamber 46 is connected by a transfer channel 48 to ignitor chamber 42 by a further angled passage 50. Both passages 44 and 50 contain inlet supply check valves 52 and 54, respectively, each consisting of a conventional type ball pressed onto a seat by a spring 56 to provide a one-way flow action.

Prior to ignition, assume that ignitor chamber 42 contains an air/fuel mixture charge previously inducted during an upward movement of ignitor piston 26 to the position shown. This mixture charge will be approximately at the same compression temperature as the charge in the cylinder 14 due to the continuously open orifice 22. The upward stroke of the ignitor piston takes place as a result of increasing gas pressure in the chamber during the compression stroke in the main cylinder combustion chamber 14. No hydraulic pressure is acting in chamber 38 on plunger 28 at this time. At a specific instant, therefore, hydraulic pressure applied to the top of plunger 28 will drive the latter and ignitor piston 26 downwardly. Some of the gas displaced by the downward stroke of the piston will escape through orifice 22 into the main cylinder. However, the rate of the gas escape is limited by the size of the orifice and the magnitude of acoustic velocity and remains substantially lower than the rate of mixture charged displacement by ignitor piston 26. As a result, the remaining gas in ignitor chamber 42 is compressed to pressures and temperatures much higher than those in main combustion chamber 14, to the auto-ignition level, and the fuel in the ignitor chamber 42 then ignites. At this time, ignitor piston 26 will already be below inlet check valve 54 and, therefore, the latter is never exposed to the harsh environment of combustion. A check valve also would be provided in high pressure hydraulic inlet line 40 to prevent reverse movement of ignitor piston 26 during combustion even if the gas pressure force acting on piston 26 would exceed the hydraulic force acting on plunger 28. Ultimately, the hydraulic force on plunger 28 will move ignitor piston 26 to its lowermost position at the bottom of ignitor chamber 42 where it will remain until the hydraulic pressure on plunger 28 is removed or deactivated when the next compression stroke occurs in the main cylinder.

During the downward movement of ignitor piston 26, the vacuum created by movement of the piston will open inlet check valve 52 and permit the air/fuel mixture to flow into supply chamber 46 behind piston 26. The volume of the intake will be equal to the piston displacement less the displacement of plunger 28. As stated previously, the piston 26 will remain in its downward position until the compression stroke of the engine is about to occur, whereupon the hydraulic actuating fluid pressure is relieved from the backside of plunger 28. Thereafter, the increasing gas pressure in the engine combustion chamber during the compression stroke of the engine will cause a first stage movement of the piston 26 upwardly. During this upward movement, the increased pressure in supply chamber 46 will cause inlet check valve 52 to close and force the fuel behind the ignitor piston 26 through transfer channel 48 to open inlet check valve 54 and permit transfer of the fuel into ignitor chamber 42. Thus, the ignitor chamber becomes charged with an air/fuel mixture that is increased to a pressure level equal to that of the ambient pressure and temperature level in combustion chamber 14 via orifice 22, ready for the second stage compression upon supply of high pressure hydraulic fluid to the plunger chamber 38.

FIG. 2 illustrates schematically a hydraulic actuating system that could be used in connection with the ignitor shown in FIG. 1. In this instance, an engine driven high pressure hydraulic pump would receive a supply of fluid from a sump and supply the same through the check valve indicated into a high pressure accumulator containing a substantial volume of compressed fluid. The pressure relief valve indicated prevents the pressure from exceeding a specified limit. A three-way solenoid valve would connect the ignitor line 40 of FIG. 1 either with the accumulator or with a return line to the sump. Whenever connection between the ignitor and accumulator was established, expansion of the pressurized fluid in the accumulator would create a high pressure flow to ignitor line 40, which then would drive the ignitor plunger 28 and piston 26 downwardly until auto-ignition or compression ignition would occur. Since the volume of the accumulator would be large in comparison of displacement of plunger 28, there would be very little pressure drop associated with expansion of the fluid, and, for all intents and purposes, the hydraulic force driving the plunger 28 would remain constant during the entire plunger stroke. The check valve indicated between the accumulator and the three-way solenoid valve would prevent reverse flow of hydraulic fluid back from the ignitor to the accumulator, and only when the three-way valve connected the ignitor with the return to sump would the return stroke of plunger 28 and ignitor piston 26 be accomplished. Controlling the timing of the three-way solenoid valve actuation would control the ignition timing.

FIG. 3 shows an alternative embodiment of the invention. In FIG. 1, the air/fuel mixture was inducted into supply chamber 46 during the downward stroke of ignition piston 26. In FIG. 3, a separate air/fuel mixture line 60 is connected through housing 18' of the ignitor directly into ignitor chamber 42' at a point on the front side of the ignitor piston 26 when it is in its upwardmost, first-stage compression position. Suitable vent passages 62 connected to the chamber behind piston 26, are provided for relieving any pressure buildup behind the piston. In this case, the air/fuel mixture would be sucked in by a vacuum created by a fast upward stroke of ignitor piston 26 and aided by a return spring 64 located in the fluid actuating chamber 38' surrounding modified plunger 28'. In all other respects, the embodiment of FIG. 3 will operate in a manner essentially the same as that described in connection with the FIG. 1 embodiment.

While the invention has been shown and described in its preferred embodiments, it will be clear to those skilled in the arts to which it pertains, that many modifications and changes may be made thereto without departing from the scope of the invention.

I claim:

1. A two-stage compression fuel ignitor for use in the cylinder head of an internal combustion engine comprising a hollow cylindrical housing extending through the cylinder head into the engine combustion chamber, the housing having a central bore essentially closed at one end with an air/fuel mixture charge orifice connecting the bore to the combustion chamber to subject the bore to combustion chamber temperature and pressure levels, a piston slidably mounted in the bore defining an ignitor chamber between the piston and orifice pressurized to a first pressure level by the ambient pressure in the combustion chamber during the compression stroke of the engine thereby moving the piston in one direction through a first stage return movement, power means acting on the piston in the opposite direction to move the same through a second stage movement to pressurize the ignitor chamber to a second stage substantially higher auto ignition pressure level, and air/fuel mixture charge supply means selectively connected to the ignitor chamber for supplying air and fuel thereto for compression by the piston to the auto ignition level and passage of the ignited mixture charge through the orifice into the main combustion chamber, the bore defining a mixture charge supply chamber on the other side of the piston opposite the ignitor chamber side, a mixture charge passage containing an air/fuel mixture supply connected to the supply chamber for induction of the charge during the second stage movement of the piston, a one-way check valve in the supply passage, a bypass passage connecting the supply chamber to the ignitor chamber around the piston, and a second one-way check valve in the bypass passage permitting induction of the charge into the ignitor chamber during movement of the piston in the one direction while preventing a return flow during movement of the piston in the opposite direction.

2. A two-stage compression fuel ignitor for use in the cylinder head of an internal combustion engine comprising a hollow cylindrical housing extending through the cylinder head into the engine combustion chamber, the housing having a central bore essentially closed at one end with an air/fuel mixture charge orifice connecting the bore to the combustion chamber to subject the bore to combustion chamber temperature and pressure levels, a piston slidably mounted in the bore defining an ignitor chamber between the piston and orifice pressurized to a first pressure level by the ambient pressure in the combustion chamber during the compression stroke of the engine thereby moving the piston in one direction through a first stage return movement, power means acting on the piston in the opposite direction to move the same through a second stage movement to pressurize the ignitor chamber to a second stage substantially higher auto ignition pressure level, and air/fuel mixture charge supply means selectively connected to the ignitor chamber for supplying air and fuel thereto for compression by the piston to the auto ignition level and passage of the ignited mixture charge through the orifice into the main combustion chamber, the supply means including a fuel/air mixture charge port extending through the housing into the ignitor chamber located on the ignitor chamber side of the piston when the piston is in a return position, and mixture charge vent means connected to the opposite high pressure side of the piston to vent buildup of fuel/air mixture charge pressure behind the piston during the return movement of the piston in the one direction.

3. An ignitor as in claims 1 or 2, the piston including a plunger attached thereto and acted thereupon by the high pressure fluid.

4. An ignitor as in claim 2, including spring means biasing the piston to a return position.

5. An ignitor as in claim 1 or 2, the piston including a plunger attached thereto, the housing having a portion thereof slideably receiving the plunger therein and being spaced therefrom to define a second actuating chamber for the admission of high pressure fluid thereto to move the plunger and piston through its second stage movement.

6. An ignitor as in claims 1 or 2, the piston including a plunger attached thereto, the housing having a portion thereof slidably receiving the plunger therein and being spaced therefrom to define a second actuating chamber for the admission of high pressure fluid thereto to move the plunger and piston through its second stage movement including sleeve means sealingly surrounding the plunger in a relative slidably manner and located between the fluid pressure chamber and the back side of the piston.

* * * * *